Dec. 19, 1961 R. H. LOUGHRAN 3,013,388
GAS GENERATING APPARATUS
Filed Oct. 1, 1958
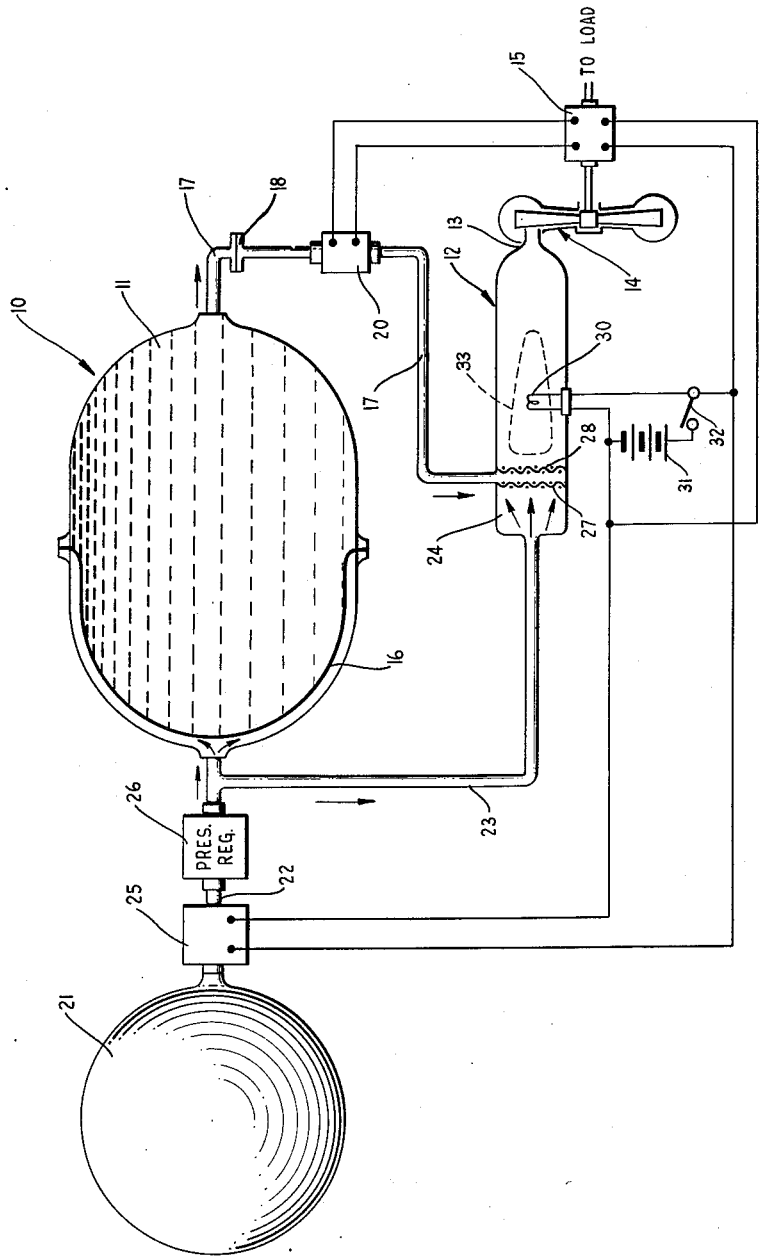
ROBERT H. LOUGHRAN,
INVENTOR
BY
·AGENT

United States Patent Office 3,013,388
Patented Dec. 19, 1961

3,013,388
GAS GENERATING APPARATUS
Robert H. Loughran, Playa Del Rey, Calif., assignor to Hughes Aircraft Company, Culver City, Calif., a corporation of Delaware
Filed Oct. 1, 1958, Ser. No. 765,706
5 Claims. (Cl. 60—39.46)

This invention relates to a gas generating apparatus or fuel feeding apparatus for use in connection with a propellant system. Particularly, the apparatus hereof is intended for use in connection with gas generating systems employed in small power supply apparatus as may be used in small aerial vehicles and the like.

In apparatus such as rockets, guided missiles and the like, it is often desirable to provide an apparatus carried thereby that will serve to generate necessary electrical energy, provide hydraulic power or serve other power supply purposes. Apparatus of this type must necessarily be relatively small, light weight and efficient, in order that it may be compatible with weight requirements of such aerial vehicles. In most instances, terminal operation of the power supply apparatus is desirable, inasmuch as rockets and missiles employing these structures are usually ultimately destroyed and power requirements need only be provided during relatively short flight phases.

In such power supply apparatus, it has become common to employ small gas generators which serve to drive a turbine or the like. Such generators have also commonly used both solid and liquid types of monopropellants such, as for example, ethylene oxide, or the like, that is conducted to a suitable combustion chamber, ignited and burned therein. However, when using liquid monopropellants such as ethylene oxide in generators employing combustion chambers of the order of ¾″ diameter and 2 or 3″ long, considerable difficulty has been experienced in properly atomizing the propellant in order to obtain desired efficiency and further in order to enable proper ignition thereof without employing high current (1200 watts or more) igniters. Such high current is often not available, it being the objective to ignite such fuel through use of less current with a resistance igniter or with an ordinary spark plug or similar device. Particularly, inasmuch as the combustion chambers employed in apparatus of this type are relatively small, the use of the usual atomizing nozzles for propellant is not satisfactory, inasmuch as insufficient area or distance exists to permit the required atomization and evaporation of the propellant in the combustion chamber before the liquid propellant impinges on the wall.

Inasmuch as gas generators of the present type are usually expendable, it is important that such generators be manufactured at low cost and that apparatus employed for propellant atomization not only be efficient for the purpose but also be of a nature to permit manufacture and installation also at low cost.

It is therefore one object of the present invention to provide a gas generator that is extremely small, light weight and efficient.

Another object of the invention is to provide a small gas generator having means for complete atomization of a liquid propellant within the confines of a relatively small combustion chamber.

A further object of the invention is to provide a propellant system for a small gas generator wherein a single means is provided for supplying motive energy for biasing liquid propellant for delivery to a combustion chamber and for providing an atomizing pressure on the propellant delivered to the combustion chamber.

Another object of the invention is to provide a gas generator wherein only minimum energy is required to ignite a liquid propellant.

Other and further important objects of the invention will become apparent from the disclosures of the following detailed specification, appended claims and accompanying drawing, wherein:

The single figure is a schematic representation of the propellant system of the present invention.

With reference to the drawing, the propellant system hereof includes a propellant tank 10 that is adapted to retain a suitable liquid monopropellant 11, such as for example, ethylene oxide or the like. The propellant is adapted for delivery to a combustion chamber 12 wherein high temperature gas is generated for delivery through a nozzle 13 to a turbine or the like indicated generally at 14. The turbine 14 may operate through a speed regulating mechanism 15 and serves to drive a suitable load such as, for example, an alternator, hydraulic pump or similar mechanism.

The propellant tank 10 is provided with a movable wall or diaphragm 16 that is bulbous and serves to define one side of the propellant chamber within the tank. The construction is such that upon a pressure increase in an area between the diaphragm 16 and an inner wall of the tank 10 opposite from the propellant engaging side of the diaphragm, the liquid propellant will be forced from the tank 10 into a conduit 17. The conduit 17 may be provided with a frangible diaphragm 18 and a flow control mechanism 20 and extends to the combustion chamber 12.

As shown, a gas bottle 21 is provided in the present system. The bottle 21 is initially filled with a gas under high pressure. The bottle 21 contains any suitable gas such as inert nitrogen or the like or may contain an oxidizing gaseous material such as air. The gas from the bottle 21 is adapted for conduction by way of a conduit 22 to the area of the propellant tank 10 between the diaphragm 16 and the outer wall of the tank, whereby to pressurize and bias the propellant toward the combustion chamber 12. The pressurizing gas is also conducted by way of a branch conduit 23 to one end 24 of the combustion chamber 12, this combustion chamber end 24 being remote from the location of the nozzle 13. The conduit 22 is further provided with a normally closed arming valve 25 that is positioned therein immediately downstream from the gas bottle 21 and with a pressure regulating valve 26 that is disposed between the arming valve 25 and the branch conduit 23.

As shown, the combustion chamber 12 further includes a pair of spaced transversely disposed perforated members 27 and 28. The perforated members 27 and 28 are disposed adjacent the end 24 of the combustion chamber, the conduit 17 being disposed for delivery of the liquid propellant to an area intermediate the perforated members 27 and 28. The perforated members 27 and 28 may be either perforated or may be in the form of a screen mesh of stainless steel or the like and having openings in the order of a 200 mesh. Gas from the gas bottle 21 is delivered through the conduit 23 to the combustion chamber and passes through the perforated members 27 and 28, the pressure thereof being such as to provide, for example, 1 to 2 atmospheres of pressure drop across the members 27 and 28.

In order to provide ignition of the liquid propellant within the combustion chamber 12, a suitable igniter 30 is provided therein. The ignitor 30 may be in the form of a spark plug or a glow plug and is energized from a suitable source of electrical energy such as a battery 31. A switch 32 serves to interconnect the ignitor 30 with the battery 31. The switch 32 further serves to connect the battery 31 to the turbine speed regulating device 15 and to the arming valve 25. In this connection, it is to be understood that, while a portion of the structures herein are shown and described as being electrically operated, other types of operation may be utilized without departing from the spirit and scope of this invention. As further shown, the speed control mechanism 15 is electrically connected with the propellant flow control valve 20, whereby to enable the control of propellant flow in response to the rotational speed of the turbine 14.

Thus, in operation of the present device, when the switch 32 is closed, the arming valve 25 will be opened, the igniter 30 energized and suitable power will be delivered to the speed control mechanism 15 and propellant flow control valve 20. Gas under regulated pressure will thereafter be delivered through the conduit 22 and to the propellant tank 10, whereby to pressurize the liquid propellant 11. This gas will simultaneously be conducted through the conduit 23 and into the end 24 of the combustion chamber 12. The pressure on the propellant 11 serves to fracture the diaphragm 18 and permit flow thereof through the conduit 17 and to the combustion chamber. The liquid propellant will be delivered between the spaced perforated members 27 and 28 and will thereafter be transmitted to the interior of the combustion chamber 12 by the force of the pressurizing gas intering the combustion chamber end 24 and flowing through the perforated members. The liquid propellant will thus be fully atomized to provide a condition for relatively easy ignition thereof by means of the relatively low power igniter 30. It may be seen that propellant combustion will take place in the combustion chamber 30 and in the area indicated by the dotted lines 33, the gas created thereby being delivered through the nozzle 13 to impinge upon and drive the wheel of the turbine 14 and the load thereon. The particular location of the perforated members 27 and 28 and the igniter 30 within the combustion chamber 12 is such as to place the perforated members 27 and 28 in an area remote and upstream from the propellant combustion area 33. Accordingly, the perforated members 27 and 28 will be maintained relatively cool, thus enabling use of relatively light and inexpensive screen structures or the like. The perforated members 27 and 28 will also be further cooled by the latent heat of evaporation of the liquid propellant and pressurizing gas passing therethrough.

By employing an inert gas such as nitrogen in the gas bottle 12, the liquid propellant is easily ignited in the combustion chamber 12; however, the energy output at the nozzle 13 is below a possible maximum. The use of an oxidizer such as oxygen or air in the gas bottle 21 serves to provide increased energy from the liquid monopropellant and it has been found that such monopropellant is less difficult to ignite when so combined with the oxidizer.

It is therefore apparent that there has been provided a propellant system for a small gas generator that is efficient in operation and which provides the required atomization of the propellant to enable subsequent ignition thereof with a small amount of energy and improved efficiency for the device. Additionally, the present structure is adapted particularly for use in connection with small combustion chambers wherein atomization and ignition problems are encountered. Furthermore, the mechanism taught hereby serves to provide the desired effects at low cost and with extreme ease of manufacture.

Having thus described the invention and the present embodiment thereof, it is desired to emphasize the fact that various propellant storage and propellant flow mechanisms may be employed herewith, and other modifications may be resorted to in a manner limited only by a just interpretation of the following claims.

I claim:

1. In a gas generating apparatus: a combustion chamber; a liquid propellant container; a pair of perforated members disposed in spaced relationship transversely within said combustion chamber; means for conducting propellant from said container to an area intermediate said perforated members; a pressurizing gas bottle; means for conducting gas from said bottle to combustion chamber upstream from said perforated members, said gas being adapted for flow through and be separated into finely divided streams by a first of said perforated members to combine with said propellant in said area intermediate said perforated members, thereafter to pass through a second of said perforated members carrying therewith finely divided particles of said propellant whereby to atomize said propellant; means positioned in said combustion chamber downstream from said perforated members for igniting said atomized propellant; and means for conducting combustion products from said combustion chamber.

2. A gas generating apparatus comprising, in combination; a combustion chamber; a liquid propellant container; a pair of perforated members disposed in spaced relationship transversely within said combustion chamber; means for conducting propellant from said container to an area intermediate said perforated members; a pressurizing gas bottle; means for conducting gas from said bottle and into pressurizing relationship with said propellant in said container; means for conducting said gas to said combustion chamber upstream from said perforated members, said gas being adapted for flow through and be separated into finely divided streams by a first of said perforated members to combine with said propellant in said area intermediate said perforated members, thereafter to pass through a second of said perforated members carrying therewith finely divided particles of said propellant whereby to atomize said propellant; means positioned in said combustion chamber downstream from said perforated members for igniting said atomized propellant; and means for conducting combustion products from said combustion chamber.

3. In a gas generating apparatus: a combustion chamber; a liquid propellant container; a pair of perforated members disposed in spaced relationship transversely within said combustion chamber; means for conducting propellant from said container to an area intermediate said perforated members; a pressurizing gas bottle; means for simultaneously conducting gas from said bottle to said propellant container to pressurize said propellant therein and to said combustion chamber upstream from said perforated members, said gas being adapted for flow through and be separated into finely divided streams by a first of said perforated members to combine with said propellant in said area intermediate said perforated members, thereafter to pass through a second of said perforated members carrying therewith finely divided particles of said propellant whereby to atomize said propellant; electrically operated ignition means positioned in said combustion chamber downstream from said perforated members for igniting said atomized propellant; and means for conducting combustion products from said combustion chamber to a point of use.

4. In a gas generating apparatus, the combination of: an elongated combustion chamber having a size in the order of three quarters of an inch in diameter and at least one inch in length; a liquid propellant container; a pair of perforated members disposed in spaced relationship transversely within said combustion chamber; means for conducting propellant under pressure from said container to an area intermediate said perforated members; a pressurizing gas bottle; means for conducting gas from said bottle to said combustion chamber upstream from said perforated members, said gas being adapted for flow through and be separated into finely divided streams by a first of said perforated members to combine with said propellant in said area intermediate said perforated members, thereafter to pass through a second of said perforated members carrying therewith finely divided particles of said propellant whereby to atomize said propellant; low energy electrically operated ignition means positioned in said combustion chamber downstream from said perforated members for igniting said atomized propellant; and means for conducting combustion products from said combustion chamber.

5. In a gas generating apparatus, the combination of: an elongated combustion chamber having a size in the order of three quarters inch in diameter and at least one inch in length; a liquid propellant container; a pair of screens disposed in spaced relationship transversely within said combustion chamber; means for conducting propellant from said container to an area intermediate said screens; a pressurizing gas bottle; conduit means for simultaneously conducting gas from said bottle to said propellant container to pressurize said propellant therein and to said combustion chamber upstream from said screens, said gas being adapted for flow through and be separated into finely divided streams by a first of said screens to combine with said propellant in said area intermediate said screen thereafter to pass through a second of said screens carrying therewith finely divided particles of said propellant whereby to atomize said propellant; low energy electrically operated ignition means positioned in said combustion chamber downstream from said screens for igniting said atomized propellant; and nozzle means for conducting combustion products from said combustion chamber to a point of use.

References Cited in the file of this patent

UNITED STATES PATENTS

| | | |
|---|---|---|
| 465,746 | Ames | Dec. 22, 1891 |
| 2,505,798 | Skinner | May 2, 1950 |
| 2,551,112 | Goddard | May 1, 1951 |
| 2,551,115 | Goddard | May 1, 1951 |
| 2,754,657 | Ehorn | July 17, 1956 |
| 2,858,672 | Clark | Nov. 4, 1958 |
| 2,926,492 | Flanagan | Mar. 1, 1960 |